United States Patent [19]
Fresonke et al.

[11] Patent Number: 5,443,674
[45] Date of Patent: Aug. 22, 1995

[54] POLYURETHANE DISPERSIONS FOR BOOK BINDING

[75] Inventors: Flavia M. Fresonke, Spring Lake Park; Ramesh Mehta, Roseville, both of Minn.

[73] Assignee: H. B. Fuller Licensing & Financing Inc., Wilmington, Del.

[21] Appl. No.: 938,872

[22] Filed: Aug. 31, 1992

[51] Int. Cl.$^6$ ................................................ C09J 4/00
[52] U.S. Cl. ........................... 156/331.7; 156/908; 412/8; 524/507
[58] Field of Search ............... 524/507; 412/8; 156/331.7, 908

[56] References Cited

U.S. PATENT DOCUMENTS

| | | | |
|---|---|---|---|
| 3,862,074 | 1/1975 | Hickey | 524/507 |
| 3,867,171 | 2/1975 | Ellsworth | 117/38 |
| 3,931,077 | 1/1976 | Uchigaki et al. | 524/507 X |
| 4,048,001 | 9/1977 | Remley | 156/331 |
| 4,299,410 | 11/1981 | Jukola | 412/8 |
| 4,433,095 | 2/1984 | Hombach et al. | 524/563 |
| 4,536,012 | 8/1985 | Hume, III | 427/285 X |
| 4,636,546 | 1/1987 | Chao | 524/507 |
| 4,681,934 | 7/1987 | Shibanai et al. | 536/46 |
| 4,735,981 | 4/1988 | Rich et al. | 524/507 X |
| 4,907,822 | 3/1990 | Carter et al. | 281/15.1 |
| 4,927,876 | 5/1990 | Coogan et al. | 524/507 X |
| 4,948,829 | 8/1990 | Mitsuji et al. | 524/507 X |
| 4,983,662 | 1/1991 | Overbeek et al. | 524/507 X |
| 5,011,881 | 4/1991 | Fujii et al. | 524/507 X |
| 5,090,861 | 2/1992 | Malcolm et al. | 412/37 |
| 5,169,888 | 12/1992 | Sales | 524/507 X |
| 5,227,422 | 7/1993 | Mitsujii et al. | 524/507 X |

FOREIGN PATENT DOCUMENTS

| | | |
|---|---|---|
| 0379158 | 7/1990 | European Pat. Off. . |
| 91/15529 | 4/1991 | European Pat. Off. . |
| 0454413 | 10/1991 | European Pat. Off. . |
| 0490026 | 6/1992 | European Pat. Off. . |
| 2100670 | 6/1981 | United Kingdom . |

OTHER PUBLICATIONS

Cyanamid, "Aqueous Polyurethane Dispersions from TMXDI® (META) Aliphatic Isocyanate", No. UP-T-018B, Feb. 1989.
Rebsamen, "OTABIND—a New Lay-flat Paperback Binding", *Publishers Weekly*, pp. 83–88 (Mar. 4, 1988).
Arendt et al., "m- and p-TMXDI: Two New Isocyanates For the Polyurethane Industry," *Journal of Cellular Plastics*, Nov./Dec. 1982, pp. 376–383.
Cody, "TMXDI® (META) Aliphatic Diisocyanate A Versatile Polyurethane Component", presented at Polyurethanes Tomorrow Conference, Milan, Italy, May 13, 1988.
Terbilcox et al, "How Emulsion Polymer/Isocyanate Adhesives Solve Bonding Problems", *RPN Technical Notebook*, Mar. 11, 1985.

*Primary Examiner*—Judy M. Reddick
*Attorney, Agent, or Firm*—Merchant, Gould, Smith, Edell, Welter & Schmidt

[57] ABSTRACT

A method of binding book blocks to form books is disclosed. The method involves applying an aqueous composition to the spine area of a book block and removing the volatile components of the composition. The composition comprises (1) an aqueous vehicle, a film-forming polymeric resin, and a polyurethane resin or (2) an aqueous polyurethane dispersion or emulsion. The composition may also include an alkaline component. In another embodiment, the composition comprises a mixture of an aqueous, film-forming polymeric latex, an alkaline component to adjust the pH the latex to that of an aqueous polyurethane dispersion, and the aqueous polyurethane dispersion.

11 Claims, No Drawings

POLYURETHANE DISPERSIONS FOR BOOK BINDING

FIELD OF THE INVENTION

The subject of the present invention is an aqueous adhesive composition useful in bookbinding operations and a method for using this composition in such operations. The adhesive composition comprises an aqueous polyurethane dispersion or emulsion alone or in combination with a latex emulsion which provides increased adhesive structural properties for improved bookmaking. For example, the adhesive may be used as a primer or as a structural adhesive in bookbinding.

BACKGROUND OF THE INVENTION

Bookmaking requires the use of a wide variety of adhesives. Adhesives are used in making hard book covers, casing book blocks into hard covers, applying paper covers to book blocks, and the binding of book blocks themselves. The binding of book blocks themselves is generally the most demanding adhesive application in the industry. Adhesives may be used alone or in cooperation with other mechanical binders such as sewing and staples.

One use of adhesives in binding book blocks is as a primer to wet the spine area of the book block and provide a tie coat for an additional adhesive layer. The additional adhesive layer provides structural support and generally maintains the mechanical integrity of the binding. Priming adhesives are generally aqueous emulsions of film-forming polymers which can readily wet the spine of the book block. The emulsions may be thermoplastic copolymers, acrylates, animal glues, etc. An example of a particular primer composition is disclosed in Hume, III, U.S. Pat. No. 4,536,012. This reference discloses a significant advance in the art and employs a latex primer composition which includes ungelatinized starch particles to form a primer film resistant to blistering and subsequent charring. The latex primer composition is generally prepared from such known resins as vinyl acetate-acrylic acid copolymers, styrene-butadiene copolymers, and ethylene-vinyl acetate (EVA) copolymers, etc.

Structural adhesives may be either aqueous emulsions or hot melt adhesives. The aqueous emulsions are primarily EVA's, polyvinylacetates (PVAc's), or other vinyl copolymers which incorporate external plasticizers. Hot melts are often thermoplastic styrene block copolymers or EVA's. An example of a particular hot melt structural adhesive composition is disclosed in Malcolm et al., U.S. Pat. No. 5,090,861. This reference also discloses a significant advance in the art and relates to the use of radial block copolymer, a tackifying resin, and a plasticizing oil in a hot melt adhesive for bookbinding. This adhesive has enhanced resistance to cold flow and creep.

There are a number of methods of binding book blocks during book manufacture. These methods employ mechanical fasteners (e.g., sewn or stapled bindings), mechanical fasteners in conjunction with adhesives, or purely adhesive bindings. Generally, high quality books are prepared form signatures (bundles of pages) which are sewn together. These signatures are then combined with adhesives to form the binding. However, this process is generally limited to books which require a very structurally sound binding.

One of the most widely used binding methods today is known as perfect binding. This may be used for either hard or soft cover bindings. In perfect binding, the sewing of signatures is eliminated. The pages are printed on a web of paper, and the book block is formed by folding this web and arranging into a signature stack. One or more signatures are then clamped and cut, and the page folds are cut and roughened or otherwise prepared for the application of the binding adhesives. The adhesives essentially provide all of the structural support for the book's binding. This requires the adhesives formulator to carefully balance such properties as strength, flexibility, resistance to cold flow, resistance to low temperature embrittlement, etc. The balancing of strength and flexibility has been particularly difficult.

In hard cover or case bookbinding, an important structural form of the binding is called the rounding of the spine or binding. This is the convex shape of the spine which distributes the stresses of opening the book across the width of the binding. It is important that a binding maintain its rounding in high quality books to provide stress distribution for the life of the book. Many current adhesives are incapable of providing years of maintaining the rounding. A new development in rounding is disclosed in Carter et al., U.S. Pat. No. 4,907,822. This reference relates to the use of a polyurethane hot melt adhesive to bind book block signatures and rounding the bound book blocks. However, there are limitations and difficulties in applying polyurethane hot melts, e.g. (1) lack of green strength (3–7 day cure), (2) requires use of special equipment, and (3) presents toxicity and requires increased ventilation issues due to the presence of free isocyanate. Therefore, bookbinders are constantly demanding improvements in this area.

A recent innovation in the bookbinding industry relates to the creation of paperback books having some of the attributes of hard bound books. This is being introduced as the OTABIND TM system, and is discussed in Rebsamen, "OTABIND—A New Lay-flat Paperback Binding", Publishers Weekly, pp. 83–88 (Mar. 4, 1988), and Jukola, U.S. Pat. No. 4,299,410 and G.B. Pat. No. 2100670B. This binding system incorporates two separate emulsion adhesives to bind the book blocks. The binding allows the manufacture of soft cover books having the ability to be opened flat without breaking the binding as normally occurs with low cost, mass produced paperbacks using hot melt adhesives. This system also produces books having improved cold temperature performance. While the OTABIND TM process may be an improvement in technique, there remains a need for improved aqueous adhesives for use in the system.

The bookbinding industry continues to demand increased performance from adhesives manufacturers. In particular, improvements are required in drying characteristics, bond strength, flexibility, shape retention, and versatility of aqueous emulsion bookbinding adhesives. Therefore, a new and versatile aqueous emulsion bookbinding adhesive is needed which can be used as a primer by itself to provide permanent rounding and shape retention, excellent bond strength, and acceptable drying characteristics.

SUMMARY OF THE INVENTION

The present invention relates to the use of an aqueous adhesive composition in bookbinding. In general, the aqueous composition (1) has a solids content of about 35 to 70 wt-% and (2) contains an aqueous vehicle, about 0 to 90 wt-% of a film-forming polymeric resin, and about 10 to 100 wt-% of a polyurethane resin (based on the solids). The composition may also incorporate an effective amount of an alkaline component to provide a pH of about 7 to 9 in the composition. The film-forming resin and the polyurethane resin may be independently introduced into the composition as an aqueous emulsion, latex, dispersion or suspension.

The aqueous composition may be used as a primer in a two-shot adhesive system, or the composition may be the only adhesive used in the particular bookmaking operation. If the binding system is a two-shot system, the second adhesive may be a hot melt adhesive, a polyurethane moisture cure, a polyurethane dispersion/latex blend, a polyurethane dispersion, an adhesive emulsion or any other compatible adhesive. The aqueous composition may be used in the binding of traditional sewn signatures, perfect binding, the OTABIND TM system and other bookmaking procedures. The invention also relates to books prepared using the aqueous composition.

DETAILED DESCRIPTION OF THE INVENTION

The aqueous composition comprises an aqueous vehicle, a film-forming polymeric resin, and a polyurethane resin. The composition may also include an alkaline component. From another perspective, the composition may comprise a mixture of an aqueous, film-forming polymeric latex, an alkaline component to adjust the pH of the latex to that of an aqueous polyurethane dispersion, and the aqueous polyurethane dispersion.

Components

A major component in the aqueous composition is an aqueous vehicle. Generally, the aqueous vehicle is water or predominantly water with a minor amount of co-solvents or other liquids. Preferably, for reasons of reduced toxicity and costs, the aqueous vehicle is water. While deionized water is particularly preferred, it is not necessary in the broadest sense of the invention. Generally, the water is used as a carrier for the adhesive components, and after the composition is applied to an adherend, the majority of the water is evaporated or volatilized.

Film-Forming Resin

The film-forming polymeric resin may be selected from any suitable, water-dispersible thermoplastic polymeric resin. The term "water-dispersible" as used here in the specification and in the claims is intended to include water-soluble as well as water-dispersible resins. A representative, non-limiting list of useful film-forming thermoplastic polymeric resins includes acetate/butyl maleate copolymer polychloroprene, polyvinylacetate (PVAc), acrylics, styrene-butadiene rubber (SBR), thermoplastic styrene block copolymers, vinyl chloride-vinylidene chloride copolymers, ethylene-vinyl chloride copolymers, ethylene-vinyl acetate (EVA) copolymers, vinyl acetate-acrylic acid copolymers, and acrylonitrile-butadiene copolymers. Preferred classes of the film-forming resins include PVAc, acrylics, SBR, thermoplastic styrene block copolymers, and EVA. Particularly preferred film-forming resins include both carboxylated and uncarboxylated EVA and acrylic resins.

As indicated above, the film-forming thermoplastic resin is preferably provided as an aqueous emulsion. The emulsion generally includes preservatives and defoaming agents and may also include external plasticizers, tackifying resins, thickness, and surfactants. Preferred emulsions for use in the preparation of the aqueous composition of the invention include Airflex ® 400, Airflex ® 400H, ELVACE TM 40–706, and ELVACE TM 40–705.

Useful emulsions have about 40 to 70 wt-% solids. This range generally provides a good balance between ease of handling and solids concentration. Emulsions having too small a proportion of solids generally produce too dilute of an adhesive composition with too great a drying time. On the other hand, emulsions having too great a proportion of solids are generally too difficult to formulate into the adhesive composition and may require thinning before or during preparation of the adhesive composition. A more preferable range of solids content is about 45 to 65 wt-%, and a most preferred range is about 50 to 60 wt-%.

These film-forming emulsions generally have a pH of about 3.5 to 6.5, preferably about 4 to 6, and most preferably, about 4.5 to 5.5. In the preparation of the adhesive composition, the pH of the liquid system is generally adjusted upwards. Therefore, if the pH of the film-forming emulsion is too low, too great a pH adjustment will be necessary, and the film-forming emulsion may be destroyed. Higher pH's of the film-forming emulsion are uncommon, but do not appear to be detrimental in the practice of the invention.

The viscosity of the film-forming emulsion generally falls in the range of about 500 to 5,000 cP, preferably about 1,000 to 3,000 cP, and more preferably about 1,000 to 2,000 cP. However, emulsions having any viscosity can be used as long as the emulsion can be formed into the aqueous adhesive composition. Of course, if the viscosity is high enough to be difficult to handle, the emulsion can be thinned with water before or during the formation of the adhesive composition.

Polyurethane Resin

The polyurethane resin may be selected from any suitable, water-dispersible polyurethane resin. The term "water-dispersible" as used here in the specification and in the claims is intended to include water-soluble as well as water-dispersible resins. A representative, non-limiting list of useful polyurethane resins includes those prepared from linear aliphatic isocyanates such as hexamethylene diisocyanate (HDI), tetramethylenediisocyanate (TMDI), and hydrogenated methylisocyanate (HMDI); aromatic isocyanates such as toluenediisocyanate (TDI), triphenylmethane-p,p',p"-triisocyanate, diphenylmethane-p,p'-diisocyanate (MDI), dianisidine diisocyanate (DADI), and polymethylene polyphenylisocyanate (PAPI); aromatic aliphatic isocyanates such as m-tetramethylxylene diisocyanate or p-tetramethylxylene diisocyanate (TMXDI) and isophorone diisocyanate (IPDI). Preferred classes of the isocyanate compounds for use in the preparation of the polyurethane resin include aliphatic and aromatic aliphatic isocyanates. Particularly preferred isocyanate compounds are hindered aromatic aliphatic di- and triisocyanates such as TMXDI and IPDI.

The polyurethane resin is preferably formed in an aqueous dispersion. The aqueous dispersion is generally prepared from a prepolymer prepared by reacting an isocyanate compound with at least an anionic or nonionic functional polyhydroxyl material or polyol (hereinafter "functional polyol"). The functional polyol compound has at least two active or reactive hydrogens for reaction with the isocyanate groups and sufficient nonionic or anionic character which can stabilize dispersion of the resulting polyurethane polymer in an aqueous vehicle. The functional polyol may include nonionic or anionic groups, or these groups may be added during the formation of the polyurethane dispersion. For example, the nonionic or anionic functionality may be introduced by reaction with a small molecule anionic or nonionic functional compound with the functional polyol after or during reaction between the functional polyol and the isocyanate compound. The polymer forming reaction can also involve chain extenders and chain terminators and can utilize functional compounds that, after polymer formation, add pendant reactive cross-linkable groups. Optionally, the dispersed phase may also comprise fillers, antioxidants, or other functional material depending on the intended application.

The polyurethane dispersion of the invention contains a polyurethane which through a reaction between an -NCO group and an active or reactive hydrogen, typically a hydroxyl group of a polyol. The polyfunctional isocyanate compounds are reacted with sufficient polyol to form a polymer chain wherein substantially all of the -NCO groups are reacted. Of course, the chemical and physical properties of the polyurethane can be adjusted by the addition of chain extending agents, chain terminating agents and other -NCO reactive compounds that can introduce pendant cross-linkable reactivity into the polymer chain. The molecular weight of the polymer can be managed by the judicious addition of these chain extending and terminating agents. The dispersed polyurethane resins of the invention are made by adding reactant at ratios resulting in the presence of little or no active -NCO concentration after polymer formation is complete. The resulting polymer can also contain substantial amino, carboxyl, hydroxyl or other active hydrogen functionality to enter into a reaction with cross-linking agents that can bind to active hydroxyl compounds to cross-link adjacent polymer chains forming a cohesive bond.

The isocyanate compounds are reacted with functional polyol compositions to form the polyurethane composition. Generally, the functional polyol used to make the polyurethane dispersion of the invention has a molecular weight of about 500 to 3,000, preferably about 750 to 2,500, and more preferably about 1,000 to 2,000. Such functional polyols can be polyester condensation products of commercially available dicarboxylic acids and hydroxy compounds such as diols, triols, etc. Additionally, the functional polyols can be polyether diols, triols, etc., based on polymers of ethylene oxide or propylene oxide.

The functional polyols can be either low or high molecular weight materials and, in general, will have average hydroxyl values, as determined by ASTM designation E-222-67, Method B, of between about 50 and 200, and preferably, between about 90 and 140.

A representative, non-limiting list of functional polyols useful in the preparation of the polyurethane dispersion includes $C_{2-18}$ alkylene polyols such as ethylene glycol, 1,4-butanediol, and 1,6-hexanediol; cycloaliphatic polyols such as 1,2-cyclohexanediol and cyclohexane dimethanol; higher alcohols such as trimethylol propane, glycerol, and pentaerythritol; polyols containing ether linkages such as diethylene glycol, triethylene glycol, and oxyalkylated glycerol; and polyol carboxylic acids such as dimethylolpropionic acid.

In order to impart some level of flexible and elastomeric properties to the adhesive prepared from the polyurethane dispersion, the polyurethane prepolymer should preferably contain a portion of higher molecular weight polymeric polyol. The polymeric polyol is preferably predominantly linear (i.e., essentially free of trifunctional or higher functional ingredients) to avoid any chance of gelling of the resultant polymeric product and should have a hydroxyl value of less than about 150 and preferably about 90 to 140.

A representative, non-limiting list of polymeric polyols useful in the preparation of the polyurethane dispersion includes polyalkylene ether polyols such as thio ethers, poly(tetramethylene ether) glycols, poly(ethylene ether) glycols, polypropylene glycols, and the reaction product of ethylene glycol with a mixture of propylene oxide and ethylene oxide; other polyether polyols such as those formed by the oxyalkylation of glycols, 1,6-hexanediol, Bisphenol A, etc.; and polyester polyols such as reaction products of the polyesterification of organic polycarboxylic acids or anhydrides with organic polyols and polyhydroxy polyesteramides.

The polyurethane resin has sufficient nonionic or anionic character to improve its dispersibility in an aqueous vehicle. This character is imparted to the resin by including pendant nonionic or anionic groups in the polymeric chain. Preferably, the groups are anionic, and more preferably, they are acid functional anionic. As discussed above, the groups may arise from the compounds used to prepare the polyurethane polymer, or they may be derived from ionic compounds reacted with the functional polyol after its reaction with the isocyanate compound. A non-limiting list of compounds useful in such a post-polyurethane formation grafting include hydroxy carboxylic acids such as dimethylolpropionic acid, glycolic acid, lactic acid, malic acid, dihydroxymalic acid, tartaric acid; mercapto carboxylic acids such as thioglycolic acid; hydroxysulfonic acids such as hydroxyethane sulfonic acid; amino sulfonic acids such as sulfanilic acid; and amino hydroxysulfonic acids.

The acid anionic functionality of the polymeric polyol compound used in making the polymer of the invention can be stabilized using an amine, preferably a tertiary amine compound. Tertiary amine compounds generally comprise a nitrogen atom having three typically aliphatic substituents including $C_{1-15}$ alkyl groups, cyclic aliphatic groups, and the amine can itself form a portion of a cyclic aliphatic amine compound. A representative, non-limiting list of useful tertiary amines includes trimethyl amine, triethyl amine, tri-n-propyl amine, tri-n-butyl amine, n-methyl piperidine, and n-methyl pyrrolidine.

Any chain extenders and chain terminating agents usually used in preparation of polyurethane resins can be used in the practice of the invention which do not detrimentally affect the dispersibility of the polyurethane in aqueous vehicles. Chain extenders may be monofunctional or polyfunctional (including difunctional) compounds which react with a terminal -NCO group more rapidly than the -NCO group reacts with water such as polyhydroxide compounds, polyamine compounds, amino alcohols and mercapto-terminated derivatives of amines and polyhydroxy materials.

The aqueous polyurethane dispersion of the invention can also contain a variety of cross-linking agents that can cross-link chain lengthened isocyanate polymers into a more rigid structural bond. Such cross-linking agents generally have at least two chemical reactive groups that can react with adjacent polymer chains. These are compounds reactive with pendant nonionic groups, pendant anionic groups, chain nitrogen atoms, hydroxyl groups or other chain lengthened urethane polymer functionality. Typically, the cross-linking agents are added to the dispersion after formation of the polyurethane polymer. After the polyurethane dispersion is combined with the film-forming emulsion to form the aqueous composition and the composition is deposited as a film on the substrate spine, the agents then react with the existing polymer functionality causing the polyurethane resin to cure.

A representative, non-limiting list of useful curing agents includes aminoplast resins, formaldehyde, phenolic resins, alkoxyl silanes, organic polyisocyanates, epoxy containing organic materials, carbodiimide materials, aziridine materials, and epoxy-containing organic reagents.

The liquid phase of the polyurethane dispersion generally comprises a liquid vehicle and, optionally, dispersing agents, thixotropes or hardeners. The liquid vehicle facilitates transport and deposition of the polyurethane composition. Generally, the liquid vehicle is aqueous or predominantly aqueous with a minor amount (less than 50 vol-%) of organic solvent or vehicle. A mixture of aqueous and organic liquid vehicles may be useful in maintaining reactive components (e.g., a cross-linking agent and polyurethane resin) in separate phases to increase storage life of the composition. Most preferably the liquid vehicle is water to provide minimal toxicity and flammability.

The polyurethane dispersion may be prepared as discussed in the following paragraphs. This preparation protocol is one of the several general protocols mentioned above and known to those skilled in the art. This protocol is merely included as an example to aid in the understanding of the invention. It is not considered to be an exclusive manner of production of the dispersion. A polyol is dried in a reactor at about 85°–95° C. under full vacuum. An isocyanate and dimethylol propionic acid are charged into the reactor with full cooling. The reactor is closed and triethylamine is added into the reactor. The reactor temperature is maintained at 85°–95° C. allowing the prepolymerization reaction to proceed. After reaction, a sample is taken to determine percent unreacted NCO and the amine number.

The prepolymer is then dispersed into the aqueous vehicle. Once the dispersion is complete, a chain extender and a chain terminator are charged into the dispersion. The aqueous composition is mixed for a period of time sufficient to provide essentially complete mixing and chain extension/termination before being transferred into containers until use (usually about 45–60 minutes).

Useful polyurethane resin dispersions have about 30 to 60 wt-% solids. This range generally provides a good balance between ease of handling and solids concentration. Dispersions having too small a proportion of solids generally produce too dilute of an adhesive composition with too great a drying time. On the other hand, dispersions having too great a proportion of solids are generally too difficult to form into the adhesive composition and may require thinning before or during preparation of the adhesive composition. A more preferable range of solids content is about 35 to 60 wt-%, and a most preferred range is about 40 to 50 wt-%.

These polyurethane dispersions generally have a pH of about 7 to 10, preferably about 8 to 9.5, and most preferably, about 8.3 to 9.3. If the pH of the dispersion is too low, an increase in polyurethane particle size can occur. On the other hand, if the pH of the dispersion is too high, hydrolysis of the film-forming latex can occur upon combination.

The viscosity of the polyurethane dispersion is relatively low and generally fall in the range of about 25 to 3,000 cP, preferably about 25 to 1,500 cP, and more preferably about 25 to 300 cP. However, dispersions having any viscosity can be used as long as the emulsion can be formed into the aqueous adhesive composition. Of course, if the viscosity is high enough to be difficult to handle, the dispersion can be thinned with water before or during the formation of the adhesive composition.

The polyurethane dispersion can be further characterized by its resin properties. The glass transition temperature ($T_g$) of the resin is relatively low, and it generally falls within the range of about $-80°$ C. to $20°$ C., preferably about $-70°$ C. to $10°$ C., and more preferably about $-50°$ C. to $0°$ C. If the $T_g$ is too low, the resulting adhesive has low heat resistance and risks susceptability to cold flows. On the other hand, if the $T_g$ is too high, the resulting adhesive is too brittle and has poor low temperature properties.

The polyurethane resin is also quite strong and flexible. In particular, the tensile strength of the resin is generally between about 500 and 7,000 psi, preferably about 1,000 to 5,500 psi, and more preferably about 1,500 and 2,000 psi. In addition, the resin has an elongation at break of about 500 to 2,500%, preferably about 700 to 2,500%, and more preferably about 900 to 2,000%. If the tensile strength is too low, the resulting adhesive composition will not have enough strength to adequately bind the signatures into a resilient book. On the other hand, if the tensile strength is too high, the resulting adhesive is generally too brittle to withstand abuse and extreme low temperatures. If the elongation at break is too low, the adhesive composition is generally too brittle and does not possess enough flexibility to give the required "ease of openability". On the other hand, if the elongation at break is too high, the adhesive composition will have reduced resistance to creep, cold flow, etc.

Alkaline Component

The aqueous composition of the invention may also include an effective amount of an alkaline component to provide a pH of about 7 to 9 in the composition, preferably about 7.5 to 8.5, and more preferably about 8. In particular, this component is useful to adjust the pH of the film-forming emulsion to that of the polyurethane dispersion prior to combining the two aqueous components. The alkaline component may be any component which does not detrimentally affect the function of the aqueous composition. However, it is preferred that the alkaline component be a liquid or be capable of solution in the aqueous vehicle.

A representative, non-limiting list of useful alkaline components includes ammonia, and lower alkyl amines including mono-, di- and triethyl amine.

Proportions and Properties

The composition useful in the present invention generally comprises a major proportion of a liquid vehicle, about 0 to 90 wt-% of a film-forming resin, and about 10 to 100 wt-% of a polyurethane resin. The composition may also include an effective amount of an alkaline component to provide a pH of about 7 to 9 in the composition. Preferably, the film-forming resin is present at about 1 to 90 wt-%, more preferably, about 20 to 50 wt-%, and most preferably about 25 to 40 wt-%. If the proportion of film-forming resin is too low, the resulting adhesive composition has poor wet tack and the film strength (tensile strength and elongation) will be reduced. If there is too much film-forming resin in the composition, the film strength (tensile strength and elongation) can also be reduced.

In a similar manner, the polyurethane resin is preferably present at about 10 to 100 wt-%, more preferably, about 10 to 99 wt-%, and most preferably at about 50 to 80 wt-%. If the proportion of polyurethane resin is too low, the composition will not exhibit the improved adhesive characteristics such as tensile strength, flexibility, and dimensional stability. On the other hand, if there is too much polyurethane resin in the composition, the resulting adhesive composition can exhibit poor wet tack. Clearly, these proportions may be provided by selection of appropriate quantities of the film-forming emulsion and polyurethane dispersion. In particular, these resin proportions may be achieved by combining about (1) 0 to 90 wt-% of an aqueous emulsion of the film-forming resin (about 35 to 70 wt-% solids), preferably about 1 to 90 wt-% of the emulsion, and more preferably about 20 to 50 wt-% of the aqueous emulsion of the film-forming resin with about (2) 10 to 100 wt-% of a polyurethane dispersion (about 30 to 60 wt-% solids), preferably about 10 to 99 wt-% of the dispersion, and more preferably about 50 to 80 wt-% of the aqueous polyurethane dispersion. Therefore, it is apparent that the surprising improvements in bookbinding results from use of a polyurethane dispersion. Balancing the relative proportions of film-forming and polyurethane resins can also contribute to the improvements in adhesive performance. The aqueous compositions which attain these improvements generally have a solids content of about 30 to 60 wt-%, preferably about 40 to 50 wt-%, and more preferably about 40 to 50 wt-%. The alkaline component is generally present in an amount sufficient to bring the pH of the aqueous emulsion of the film-forming resin to about 8 prior to the combination with the polyurethane dispersion. Usually, this is less than about 1 wt-%, preferably about 0.1 to 0.5 wt-%, and more preferably about 0.1 to 0.3 wt-%. However, the actual amount of alkaline agent necessary will depend on the selected agent.

When the aqueous composition of the invention is used as a primer in a bookbinding operation, the liquid composition generally exhibits the following properties:

|  | Useful | Preferred | More Preferred |
|---|---|---|---|
| % Solids | 30 to 70 | 40 to 60 | 40 to 50 |
| pH | 4 to 9 | 7 to 8.5 | 7.8 to 8.2 |
| Viscosity (cP)* | 50 to 1,000 | 200 to 600 | 250 to 500 |

*As measured by Brookfield RVT viscometer at 20 rpm and 85° F. (30° C.).

When the aqueous composition of the invention is used as a structural adhesive in a bookmaking operation (including bookbinding), the liquid composition generally exhibits the following properties:

|  | Useful | Preferred | More Preferred |
|---|---|---|---|
| % Solids | 30 to 70 | 40 to 60 | 40 to 60 |
| pH | 4 to 9 | 7 to 8.5 | 7.8 to 8.2 |
| Viscosity* | 2,000 to 20,000 | 5,000 to 10,000 | 6,000 to 9,000 |

*As measured by Brookfield RVT viscometer at 20 rpm and 85° F. (30° C.).
and a film prepared from this composition generally exhibits the following physical properties:

|  | Useful | Preferred | More Preferred |
|---|---|---|---|
| $T_g$ (°C.) | −80 to 20 | −70 to 10 | −50 to 0 |
| Tensile Strength (psi) | 1,000 to 6,000 | 1,500 to 3,500 | 2,000 to 3,000 |
| % Elongation | 500 to 2,500 | 900 to 2,500 | 1,200 to 2,000 |
| Memory (%)* | 50–90 | 55–88 | 60–85 |
| Shear (°C.)** | ≧120 | ≧120 |  |
| Peel (°C.)** | ≧100 | ≧120 |  |

*See memory test method blow.
+Kraft paper substrate fails, adhesive bond does not.
**See Peel/Shear test method below.

In comparison, current products typically used in bookbinding generally have significant lower tensile strength (plasticized PVAc about 1,000 psi or lower and plasticized EVA copolymers ranging from about 400–900 psi) and signficantly lower elongation (plasticized PVAc about 900% and plasticized EVA copolymers ranging from about 1,000 to 1,100%).

Methods of Making and Use

A preferred preparation method involves charging a mixing vessel with a desired quantity of the film-forming emulsion and adding an alkaline component as needed to raise the pH of the film-forming emulsion to that of a polyurethane dispersion to be added. Of course, this may not be necessary if the emulsion is already sufficiently alkaline to be combined with the dispersion. The film-forming emulsion and polyurethane dispersion are then combined in the mixing vessel. Water may be added to adjust the % solids and viscosity if necessary. Additional components may also be added as desired. The aqueous composition may then be thoroughly mixed. The composition is usually then packaged for shipment and/or stored until use.

Again, the aqueous composition may be used as a primer in bookbinding operations, and it may be used as a structural binding adhesive. As a primer, the composition is applied to a prepared spine area of a book block to be bound. The aqueous composition thoroughly wets the spine area to form a tie coat for one or more additional adhesive layer. This tie coat also provides some structural benefits to the bound book. The primer is dried to drive off volatiles such as water and ammonia and to form the tie coat, and the additional adhesive is then applied.

In greater detail, the primer is applied by an application wheel onto a properly prepared book spine. The primer is applied generously with one wheel, pushed into the substrate with a second wheel, both running clockwise. The excess primer is than removed by a third wheel running counter-clockwise. Various scrapers can be added to remove excess primer. If only two wheels are used, the second wheel runs counterclockwise. The primer is subsequently dried by intense heat.

If the primer is for a hot melt second layer, excess primer should be removed as thoroughly as possible, and it should be completely dried. If the primer is for a latex second layer, the removal of excess primer and complete drying are less critical.

In this manner, the use of the aqueous composition of the invention as a primer provides the improvements in flex, rounding, etc., as discussed above.

The structural adhesive layer may be an emulsion adhesive or a hot melt adhesive. The emulsion adhesive may be any standard book binding emulsion such as plasticized PVAc, EVA, animal glue, SBR, or vinyl acetate/butyl maleate, or it may be a structural formulation of the present aqueous composition. Using an emulsion according to the present invention, the second shot of adhesive is applied with essentially the same series of wheels as the primer layer, but more product is left on the spine. Drying should be complete to protect the book if it is dropped bareback. The hot melt adhesive may be any standard book binding hot melt adhesive such as EVA's, thermoplastic styrene block copolymers, SBR, a radial block copolymer of Malcolm et al., U.S. Pat. No. 5,090,861 a polyamide, or a moisture cure polyurethane. The combination of the use of the primer of the invention and other structural adhesives allows the bookbinder to obtain the advantages of each component.

The aqueous composition can also be formulated for use as a single shot adhesive for bookbinding operations. In this application, the viscosity and surface tension are balanced to provide a composition which thoroughly wets the spine area of the book block and to provide sufficient adhesive solids to provide a robust, flexible, bond which is sufficiently strong to withstand cold flow, creep, etc. to provide a long-lasting binding. The adhesive is applied to the spine area of the book block and allowed to dry. The drying rate may be increased by using heaters, blowers, heat lamps, etc. The aqueous composition of the present invention generally exhibits sufficient drying speed and characteristics to reduce blistering, charring, and other problems which may be associated with standard aqueous emulsions.

The aqueous composition may also be used in perfect binding as a primer, structural adhesive or single shot adhesive. Again, the book block is prepared for binding, and the aqueous composition is applied. The volatile components are driven off through drying, and the bound book block is ready for trimming, attaching a paper cover, or other processing. This may include rounding for preparation of cased or hardbound books. In rounding, a bound book block is manipulated to form the binding into a convex shape as viewed with respect to the thickness of the spine. In other words, the center portion of the spine protrudes out from a plane defined by the spine edge of the outermost sheets in the book block. The rounding creates a permanent set to the binding which helps to distribute the stresses of opening and using the book.

The aqueous composition is also useful as a primer or structural adhesive in the OTABIND TM system. This system is described in detail in Rebsamen, "OTABIND—A New Lay-flat Paperback Binding", *Publishers Weekly*, pp. 83–88 (Mar. 4, 1988), and Jukola, U.S. Pat. No. 4,299,410, G.B. Patent No. 2100670B, herein incorporated by reference.

As indicated above, the composition is applied as a liquid, and it forms a film after the aqueous vehicle is substantially removed. The film may be formed through air drying under ambient conditions, or it may be accelerated by applying an external heat source. If the film is dried at elevated temperatures, the tensile strength generally increases. Indeed, the tensile strength can have a 30% increase when dried at about 140° F. in comparison with drying at 70° F. However, drying at too great a temperature causes degradation of the film.

MEMORY TEST METHOD

A dog bone of the product's film is prepared in accordance with ASTM-638 (herein incorporated by reference). Prior to testing tensile and elongation, the film is placed in a test bed of known dimension and is stretched to three times its original length (e.g., from one to three inches). The action of the test apparatus is reversed until the original test bed dimension (e.g., one inch) is restored. The memory loss is represented by a ratio of the distance required before a force is again measured to further stretch the sample through a second cycle to the original stretched distance (expresssed in percentage).

PEEL/SHEAR TEST METHOD

Kraft paper is laminated to form a one inch by one inch bond area. Weights are attached in the peel and shear modes and the samples are placed in an oven. The oven is programmed to increase at a certain rate of temperature. The temperature at which the bond delaminates is recorded.

Material and Equipment

1. Programmable oven, capable of a 25 Deg. C. per hour increase from 25 Deg. C. to 150 Deg. C.
2. 18 pound basis weight kraft paper.
3. 100 gram and 500 gram weights.
4. Device for monitoring oven temperatures.
5. Device for supporting samples in the oven.
6. Release paper.
7. Two glass rods, each one half inch in diameter and eight inches long. One glass rod should have a six shim at each end. The shims should be positioned so that they ride on the release paper (see below).

Procedure

1. Cut two sheets of kraft paper, each six inches by twelve inches.
2. Cut two pieces of release paper, each two inches by twelve inches.
3. Tape one piece of kraft paper to a heat insulator, such as a tablet back, heavy chip board, etc.
4. Tape the two pieces of release paper to the kraft lengthwise, in the center, exactly one inch apart.
5. Lay the second piece of kraft paper on top of the release paper so it entirely covers the first piece of kraft paper. Tape one end only of the second piece of kraft, to the composite.
6. Fold back the second piece of kraft and place the shimmed glass rod on the tape "hinge".
7. Place the unshimmed glass rod below the second sheet of kraft paper, as close to the tape "hinge" as possible. (The second piece of kraft is now between the two glass rods. The shimmed rod is on top, in view. The unshimmed rod is partially concealed by the second piece of kraft because it is folded back).
8. Pour a puddle of adhesive at its normal application temperature onto the first piece of kraft near the top and between the release paper.
9. Quickly push both glass rods across the bottom sheet of kraft paper. (The shimmed glass rod will draw the adhesive into the film and the second rod will pull the second piece of kraft paper over the first to form a bond).

10. Trim the "sandwich" widthwise into six pieces, each only one inch by four.
11. Let strips condition at room temperature for 16 hours minimum.

Testing

1. Suspend the six samples from one "tail" in the oven using the tail with the adhesive beyond the one inch square.
2. Attach a one hundred gram weigth to a tail of each three samples in peel mode.
3. Attach a five hundred gram weight to the tail of each of three samples in the shear mode.
4. Start the oven at 25 Deg. C. and increase the temperature continuously at 25 Deg. C./hour.
5. Observe the samples and note the temperature at which the samples delaminate and the weight falls.

Report

Report the average temperature at which the three peel and three shear samples fail.

Examples

The following Examples are intended to illustrate the above invention and should not be construed as to narrow its scope. One skilled in the art will readily recognize that these Examples suggest many other ways in which the present invention could be practiced. It should be understood that many variations and modifications may be made while remaining within the scope of the invention.

Example 1

23.3g of hydroxyl terminated butanediol adipate (RUCOFLEX S-102-110) and 0.1 g antioxident (IRGANOX 1076) were dried at 190°–200° F. under full vacuum. 14.1g TMXDI (meta) (available from American Cyanamid) and 1.4 g dimethylol propionic acid were charged into the reactor with full cooling. The reactor was closed and 1 g triethylamine was added into the reactor. The batch temperature was held at 185°–200° F. while monitoring % NCO. The prepolymer reaction was terminated when the % NCO was 5%. A sample of the prepolymer was taken and the corrected % NCO and amine number are measured.

The prepolymer was then dispersed in 53 g water (deionized). Upon completion of the dispersion, 0.4 g diethylene triamine was added to the aqueous dispersion as a chain extender/terminator. The extended and terminated dispersion was mixed for an additional 45–60 minutes and transferred to non-metal storage containers.

The resulting dispersion had 40% solids, a pH of 8.5, and a viscosity of 100 cP and provide a film having a tensile strength of 5,500 psi, a $T_g$ of $-50°$ C., an elongation at break of 650%, a heat activation temperature of 150°–200° C., and a moisture-vapor transfer rate of 7.6 perms/12 mil film.

Example 2

A vessel was charged with 139.1 g VA/E copolymer emulsion (AIRFLEX TM 400) and the pH was adjusted to 8.0±0.2 using NH4OH at 26° Baumé under agitation using an overhead mixer. 0.10 defoamer (FOAMASTER VF) was added to the vessel and agitation was continued. 60.0 g of the prepolymer of Example 1 was added and mixing was continued for 10 minutes. The product had a solids content of 53%, a pH of 7.8±0.2, an initial viscosity of 2,500 cP and a viscosity after overnight storage of 3,000 cP.

Example 3

A vessel was charged with 50 g VA/E copolymer emulsion (AIRFLEX TM 400H) as in Example 2. The pH was adjusted with NH4OH to 8.0±0.2. After the target pH was reached, 0.10 g defoamer (FOAMASTER VF) and a premix of 0.34 associative colloid thickener (DSX-1550) and 0.34 g water was added and mixed for 20 minutes. 148.3 g of the prepolymer of Example 1 was added as in Example 2. Initial viscosity, 3,500 cP; viscosity after 24 hours 4,000 cP; 44% solids; pH 7.8±0.2.

Example 4

A vessel was charged with 199.4 g of a aromatic polyurethane dispersion (SANCURE 1601 from SANNCOR Industries). 0.1 g defoamer (FOAMASTER VF), 0.1 g (AEROSOL OT-75Y) surface activeagent and 0.4 DSX 1515-F associative colloid thickener were added under agitation using overhead mixer and mixed for 20 minutes. 35% solids; initial viscosity of 500 cP, and pH 8.0±0.2.

Example 5

Example 4 was repeated using 199.3 g of a aliphatic polyurethane dispersion derived from (NEOTAC XR-9621 from ICI) and 0.5 g associative thickener (DSX 1514-F). The resulting composition had 38% solids; pH 8.0±0.2, and an initial viscosity of 500 cP.

Example 6

Example 2 was repeated using 50 g of a VA/E copolymer emulsion (AIRFLEX 400 H); 0.2 g NH4OH, 0.1 g defoamer (FOAMASTER VF) and 0.4 g associative thickener (DSX-1514-F), mixing for 10 minutes. Then 0.1 g surfactant (AEROSOL OT-75Y) was added with 149.2 g of the polyurethane dispersion of Example 1. The resulting composition had 44% solids; pH 7.8±0.2 and an initial viscosity of 500 cP.

Example 7

Example 6 was repeated using 199.4 g of the polyurethane dispersion of Example 1 FOAMASTER VF, and 0.1 g AEROSOL OT-75Y. After mixing 0.4 g (DSX 1514-F) associative thickness was added and the composition was mixed for 20 minutes. The resulting composition has 40% solids; pH 8.0, and an initial viscosity of 500 cP.

Example 8

Example 2 was repeated using 50 g VA/E copolymer emulsion (AIRFLEX 400H), 0.2 g NH4OH (adjusting the pH to 8), 0.1 g defoamer (FOAMASTER VF), a premix of 1.5 g associative thickness (DSX-1550) and 1.5 g water, and 146.7 g of the polyurethane dispersion of Example 1. The resulting composition had 44% solids; pH 7.8, and an initial viscosity of 12,000 cP.

Example 9

Example 8 was repeated using 50 g VA/E copolymer (AIRFLEX 400H), and 0.2 g ammonia to adjust the pH to about 8, 0.1 g defoamer (FOAMASTER VF), 1.8 g associative thickener (DSX-1514-F), 0.1 g surfactant (AEROSOL OT-75Y) and 147.8 g of the polyurethane dispersion to Example 1. The resulting composition had 44% solids; pH 7.8 and an initial viscosity of 7,000 cP.

Example 10

198 of the polyurethane dispersion of Example 1, 0.1 g defoamer (FOAMASTER VF), 0.1 g surfactant (AEROSOL OT-75Y) were mixed in a vessel. Associative thickener (DSX-1514-F) was added and mixed for 20 minutes. The resulting composition has 40% solids, pH 8.0, and an initial viscosity of 7,000 cP.

Example 11

Example 10 was repeating using 197.8 g of an aromatic polyurethane dispersion (SANCURE 1601) FROM SANNCOR Industries, 0.1 g defoamer (FOAMASTER VF), 0.1 g surfactant (AEROSOL OT-75Y), and 2 g thickener (DSX-1514-F). The resulting composition has 35% solids, pH 8.0, and an initial viscosity of 7,000 cP.

Example 12

Example 10 was repeated using 198.6 g of an aliphatic polyurethane dispersion (NEOTAC XR-9621 from ICI), 0.1 g (AEROSOL OT-75Y), 0.1 g defoamer (FOAMASTER VF) and 1.2 g thickener (DSX-1514-F). The resulting composition had 38%, pH 8, and an initial viscosity of 7,000 cP.

Again, other modifications of the invention will be apparent to those skilled in the art in light of the foregoing description. This description is intended to provide specific examples of individual embodiments which clearly disclose the present invention. All alternative modifications and variations of the invention which follow in the spirit and broad scope of the appended claims are included.

What is claimed is:

1. A method of binding a book block having a spine area to form a book comprising the step of applying to the spine area of the book block an aqueous composition having a solids content of about 30 to 70 wt-% and comprising:
   (a) an aqueous vehicle;
   (b) about 1 to 90 wt-% (based on the solids) of a polymeric, thermoplastic, film-forming resin; and
   (c) about 10 to 99 wt-% .(based on the solids) of a polyurethane resin.

2. The method of claim 1 wherein the film-forming resin is selected from the group consisting of an ethylene-vinyl acetate copolymer, a styrene-butadiene rubber, an acrylic resin, a vinyl acetate/butyl maleate copolymer, and a mixture thereof.

3. The method of claim 1 wherein the polyurethane resin is a hindered aromatic-aliphatic polyurethane resin.

4. The method of claim 1 wherein the polyurethane resin is cross-linkable.

5. The method of claim 1 wherein the aqueous composition further comprises an effective amount of an alkaline component to result in a composition pH of about 7 to 9.

6. The method of claim 1 wherein the film-forming resin and the polyurethane resin are independently introduced as an aqueous emulsion, dispersion, or suspension.

7. A method of binding a book block having a spine area to form a book comprising the step of applying to the spine area of the book block an aqueous composition having a solids content of about 30 to 70 wt-% and comprising:
   (a) an aqueous vehicle;
   (b) about 1 to 90 wt-% (based on the solids) of a polymeric, thermoplastic, film-forming resin; and
   (c) about 10 to 99 wt-% (based on the solids) of a polyurethane resin said polyurethane resin comprising the reaction product of tetramethylxylene diisocyanate and a dimethylol propionic acid.

8. The method of claim 7 wherein the film-forming resin is selected from the group consisting of an ethylene-vinyl acetate copolymer, a styrene-butadiene rubber, an acrylic resin, a vinyl acetate/butyl maleate copolymer, and a mixture thereof.

9. The method of claim 7 wherein the polyurethane resin is cross-linkable.

10. The method of claim 7 wherein the aqueous composition further comprises an effective amount of an alkaline amine component to result in a composition pH of about 7 to 9.

11. The method of claim 7 wherein the film-forming resin and the polyurethane resin are independently introduced as an aqueous emulsion, dispersion, or suspension.

* * * * *